(12) United States Patent
Takeuchi et al.

(10) Patent No.: US 10,024,668 B2
(45) Date of Patent: Jul. 17, 2018

(54) POSITION ESTIMATION SYSTEM, POSITION ESTIMATION METHOD AND MOBILE UNIT

(71) Applicant: Toyota Jidosha Kabushiki Kaisha, Toyota-shi, Aichi-ken (JP)

(72) Inventors: Eijiro Takeuchi, Nagoya (JP); Yoshiki Ninomiya, Nagoya (JP); Yuki Yoshihara, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/670,573

(22) Filed: Aug. 7, 2017

(65) Prior Publication Data

US 2018/0051990 A1   Feb. 22, 2018

(30) Foreign Application Priority Data

Aug. 18, 2016   (JP) .................... 2016-160803

(51) Int. Cl.
*G01C 21/28* (2006.01)
*G01C 21/16* (2006.01)
*G01S 19/49* (2010.01)
*G08G 1/0968* (2006.01)

(52) U.S. Cl.
CPC .......... *G01C 21/165* (2013.01); *G01C 21/28* (2013.01); *G01S 19/49* (2013.01); *G08G 1/096827* (2013.01)

(58) Field of Classification Search
CPC ....... G01C 21/165; G01C 21/28; G01S 19/49; G08G 1/096827
See application file for complete search history.

(56) References Cited

U.S. PATENT DOCUMENTS

2005/0002558 A1\* 1/2005 Franke ..................... B60R 1/00
382/154
2007/0263902 A1\* 11/2007 Higuchi ............... G05D 1/0246
382/104

(Continued)

FOREIGN PATENT DOCUMENTS

JP   2014181954 A   9/2014
JP   2015114126 A   6/2015

*Primary Examiner* — Richard M Camby
(74) *Attorney, Agent, or Firm* — Dinsmore & Shohl LLP

(57) ABSTRACT

A position estimation system estimates a position of a mobile unit including a camera that captures an image of an area around the mobile unit. The system includes an ECU configured to store a plurality of pieces of map information, the plurality of pieces of map information respectively including a plurality of pieces of image information and respectively including a plurality of pieces of first positional information. The image information corresponding to a plurality of images respectively captured at a plurality of points within a predetermined range, the first positional information being acquired based on information other than the image information and respectively corresponding to the points, environmental conditions of the map information when the images were captured are different from each other, acquire an image captured by the camera, and estimate the position of the mobile unit based on the image acquired by the ECU and the map information.

8 Claims, 7 Drawing Sheets

(56) References Cited

U.S. PATENT DOCUMENTS

2009/0210092 A1* 8/2009 Park .......................... B25J 5/00
                                                           700/259
2014/0010407 A1* 1/2014 Sinha ................. G06K 9/00664
                                                           382/103

* cited by examiner

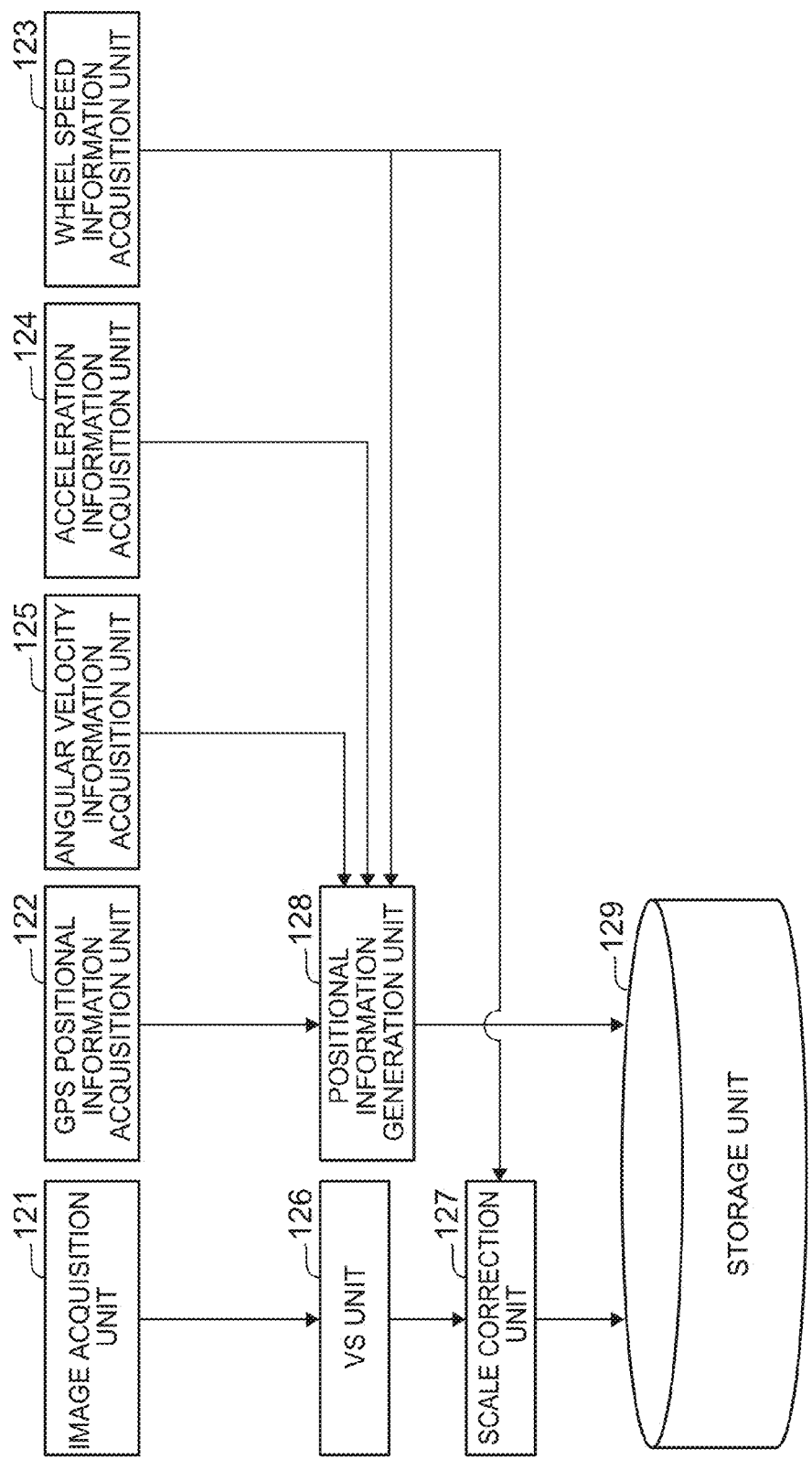

POSITION ESTIMATION SYSTEM, POSITION ESTIMATION METHOD AND MOBILE UNIT

CROSS-REFERENCE TO RELATED APPLICATIONS

This application claims priority to Japanese Patent Application No. 2016-160803 filed on Aug. 18, 2016, which is incorporated herein by reference in its entirety including the specification, drawings and abstract.

BACKGROUND

1. Technical Field

The disclosure relates to a position estimation system and position estimation method that estimate a position of a mobile unit, and a mobile unit including the position estimation system.

2. Description of Related Art

There is known a technique for estimating the position of a mobile unit, such as a vehicle, on the basis of an image that is captured by a camera mounted on the mobile unit (see, for example, Japanese Patent Application Publication No. 2015-114126 (JP 2015-114126 A)).

JP 2015-114126 A describes a technique for detecting the position of a host vehicle on the basis of a captured image of a camera mounted on the host vehicle and a map image included in map data.

SUMMARY

However, even when images are captured at the same location, the appearances of an object seen in the images can be totally different depending on an environmental condition (such as a time period condition including a difference between day and night and a weather condition including a difference among fine weather, rainy weather, snowy weather, and the like. For this reason, depending on the environmental condition, it is not possible to appropriately estimate the position of a mobile unit, so position estimation accuracy can decrease.

The disclosure provides a position estimation system and position estimation method that are able to suppress a decrease in position estimation accuracy due to a change of an environmental condition around a mobile unit when the position of the mobile unit is estimated on the basis of an image captured by a camera mounted on the mobile unit.

A first aspect of the disclosure provides a position estimation system that estimates a position of a mobile unit including a camera that captures an image of an area around the mobile unit. The position estimation system includes an electronic control unit. The electronic control unit is configured to store a plurality of pieces of map information, the plurality of pieces of map information respectively including a plurality of pieces of image information and the plurality of pieces of map information respectively including a plurality of pieces of first positional information, the plurality of pieces of image information corresponding to a plurality of images respectively captured at a plurality of points within a predetermined range, the plurality of pieces of first positional information being acquired based on information other than the plurality of pieces of image information and corresponding to the plurality of points, environmental conditions of the plurality of pieces of map information at the time when the plurality of images were captured are different from each other, acquire an image captured by the camera, and estimate the position of the mobile unit based on the image acquired by the electronic control unit and the plurality of pieces of map information.

According to the first aspect, the pieces of first positional information acquired on the basis of the information other than the plurality of pieces of image information, such as pieces of high-accuracy positional information that are acquired on the basis of Global Navigation Satellite System (GNSS)/Inertial Navigation System (INS) hybrid navigation and a range image of Light Detection and Ranging (LIDAR), may be associated with the plurality of pieces of image information respectively included in the plurality of pieces of map information. Therefore, in estimating the position of the mobile unit on the basis of an image that is acquired by the camera of the mobile unit and a plurality of pieces of image information respectively captured at a plurality of points over a predetermined range, it is possible to utilize positional information having higher accuracy than positional information that can be acquired from the image information, as first positional information that is generated on the basis of information other than the plurality of pieces of image information. For this reason, the position estimation system is able to estimate the position of the mobile unit with relatively high accuracy on the basis of the image that is acquired by the camera of the mobile unit and the plurality of pieces of map information. The position estimation system has the plurality of pieces of map information of which the environmental conditions at the time when the plurality of images corresponding to the plurality of pieces of image information were captured are different from each other. Therefore, for example, even when the environmental condition, that is, a time period condition (such as morning, daytime and night) or a weather condition (such as fine weather, cloudy weather, rainy weather, snowy weather and foggy weather), changes like the appearance of an image that is captured by the camera of the mobile unit is significantly different, map information that conforms to the current environmental condition around the mobile unit is highly likely to be included in the plurality of pieces of map information. That is, it is highly likely to be able to estimate the position of the mobile unit with the use of the plurality of pieces of image information of any one of the plurality of pieces of map information against such a change of the environmental condition that the appearance of an image that is captured by the camera of the mobile unit significantly varies. For this reason, it is possible to suppress a decrease in position estimation accuracy due to a change of an environmental condition around the mobile unit.

In the above-described first aspect, the electronic control unit may be configured to estimate the position of the mobile unit by calculating the position of the mobile unit based on the image acquired by the electronic control unit and the plurality of pieces of image information respectively included in the plurality of pieces of map information and correcting the calculated positon of the mobile unit based on the plurality of pieces of first positional information respectively included in the plurality of pieces of map information.

According to the above aspect, the electronic control unit is specifically able to estimate the position of the mobile unit with relatively high accuracy by calculating the position of the mobile unit based on, for example, a comparison between an image that is acquired by the camera of the mobile unit and a plurality of pieces of image information, and correcting the calculated position of the mobile unit on the basis of pieces of first positional information associated with the plurality of pieces of image information.

In the above-described first aspect, the plurality of pieces of image information may be three-dimensional map data, the three-dimensional map data includes pieces of positional information of a plurality of feature points extracted from each of the plurality of images and a plurality of pieces of second positional information corresponding to positions at which the plurality of images were respectively captured, the plurality of pieces of second positional information are acquired based on the pieces of positional information of the plurality of feature points corresponding to each of the plurality of images. The electronic control unit may be configured to estimate the position of the mobile unit by extracting a plurality of feature points from the acquired image, calculating the position of the mobile unit based on the pieces of positional information of the plurality of extracted feature points and the pieces of positional information of the plurality of feature points included in the three-dimensional map data, and correcting the calculated position of the mobile unit on the basis of a correspondence relationship between the second positional information and the first positional information.

According to the above aspect, the position estimation system is, for example, able to calculate the position based on three-dimensional map data generated with the use of Visual Simultaneous Localization and Mapping (SLAM), or the like. The position estimation system is specifically able to estimate the position of the mobile unit with relatively high accuracy by correcting the positon of the mobile unit based on a correspondence relationship between the second positional information included in each of the plurality of pieces of image information and the first positional information based on information other than the plurality of pieces of image information.

In the above-described first aspect, the position estimation system may be arranged remote from the mobile unit such that the position estimation system is able to receive an image captured by the camera and transmitted from the mobile unit.

According to the above aspect, the position estimation system is able to estimate the position of the remote mobile unit.

A second aspect of the disclosure provides a mobile unit. The mobile unit includes the position estimation system according to the first aspect.

According to the second aspect, the mobile unit on which the position estimation system is mounted is able to be estimated the position.

A third aspect of the disclosure provides a position estimation method in which an electronic control unit stores a plurality of pieces of map information, the plurality of pieces of map information respectively include a plurality of pieces of image information and the plurality of pieces of map information respectively include a plurality of pieces of first positional information, the plurality of pieces of image information correspond to a plurality of images respectively captured at a plurality of points over a predetermined range, the plurality of pieces of first positional information, acquired based on information other than the plurality of pieces of image information, correspond to the plurality of points, environmental conditions of the plurality of pieces of map information at the time when the plurality of images were captured are different from each other, and the electronic control unit estimates a position of a mobile unit including a camera that captures an image of an area around the mobile unit. The position estimation method includes: acquiring, by the electronic control unit, an image captured by the camera; and estimating, by the electronic control unit, the position of the mobile unit based on the acquired image and the plurality of pieces of map information.

According to the above aspects, it is possible to provide the position estimation system and position estimation method that are able to suppress a decrease in position estimation accuracy due to a change of an environmental condition around a mobile unit when the position of the mobile unit is estimated on the basis of an image captured by the camera mounted on the mobile unit.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a functional block diagram of an ECU;

DETAILED DESCRIPTION OF EMBODIMENTS

Hereinafter, an embodiment of the disclosure will be described with reference to the accompanying drawings.

The outline of the configuration of a position estimation system 1 according to the present embodiment will be described with reference to FIG. 1 and FIG. 2.

Figure 1:
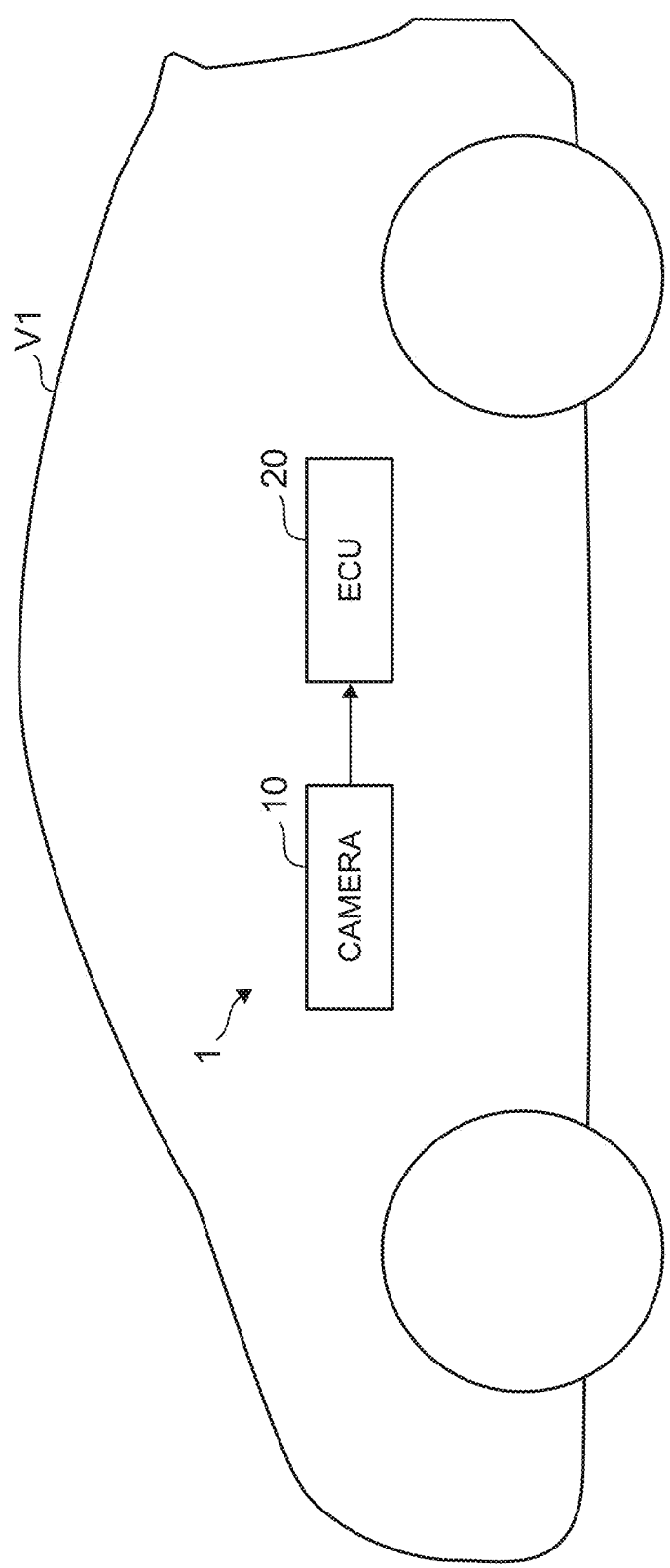
FIG. 1 is a block diagram that shows an example of the configuration of a position estimation system according to an embodiment.

FIG. 1 is a block diagram that schematically shows an example of the configuration of the position estimation system 1 according to the present embodiment.

The position estimation system 1 according to the present embodiment is mounted on a vehicle V1 that is an example of a mobile unit, and estimates the position of the vehicle V1 (host vehicle). The position estimation system 1 includes a camera 10 and an electronic control unit (ECU) 20.

The position estimation system 1 according to the present embodiment may be mounted on a mobile unit other than the vehicle V1, such as an autonomous mobile robot.

The camera 10 is an imaging device that captures an area around the vehicle V1, such as an area in front of the vehicle V1. The camera 10, for example, captures a predetermined range (specifically, a predetermined range from right to left and up and down) in front of the vehicle V1 sequentially (for example, about every 1/30 seconds) in a period from completion of initial process after the ignition of the vehicle V1 is turned on (IG-ON) to when the ignition is turned off (IG-OFF). The camera 10 is communicably connected to the ECU 20 via an in-vehicle network, such as a one-to-one communication line and a controller area network (CAN), and outputs a captured image to the ECU 20. Hereinafter, description will be made on the assumption that camera calibration of the camera 10 has been already completed and the internal parameters of the camera 10 and information about the relationship of the position and attitude of the camera 10 with respect to a reference coordinate system have been already acquired. That is, the ECU 20 is able to calculate a positional relationship, such as a distance between the camera 10 (vehicle V1) and a point on each object included in a captured image of the camera 10.

The ECU 20 is an electronic control unit that estimates the position of the vehicle V1 (host vehicle) on the basis of a captured image that is input from the camera 10. The ECU 20 is, for example, mainly formed of a microcomputer including a CPU, a RAM, a ROM, an I/O, and the like, and is able to implement various control processes by executing various programs stored in the ROM on the CPU. Hereinafter, the specific functional configuration of the ECU 20 will be described with reference to FIG. 2.

Figure 2:
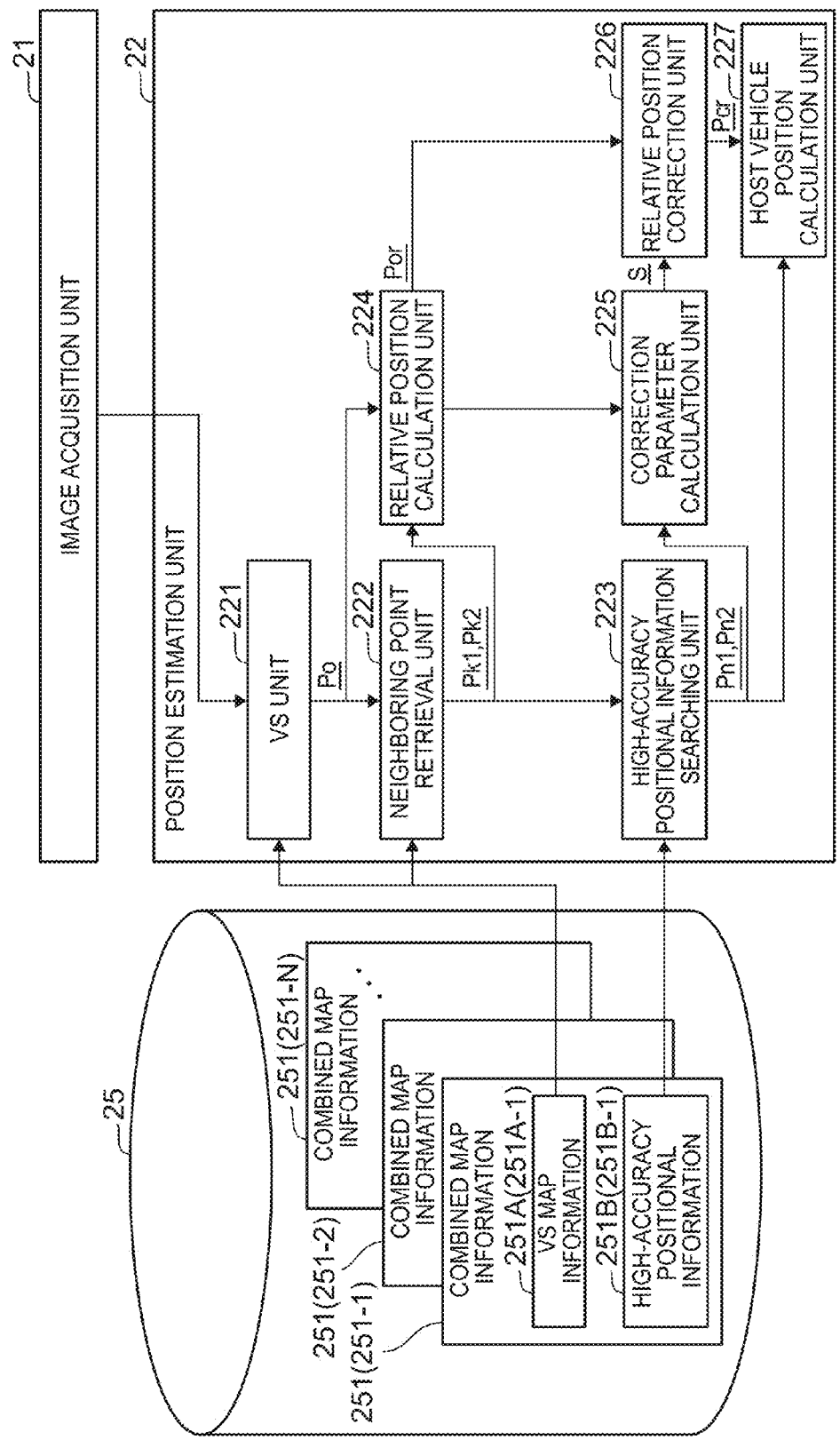
FIG. 2 is a functional block diagram of an ECU.

FIG. 2 is a functional block diagram that schematically shows an example of the configuration of the ECU 20.

The ECU 20 includes an image acquisition unit 21 and a position estimation unit 22 as functional units that are implemented by executing one or more programs stored in the ROM on the CPU. The ECU 20 includes a storage unit 25 as a storage area that is defined in advance in an internal memory, such as the ROM.

The image acquisition unit 21 acquires, from an input buffer in the RAM, a captured image that is sequentially input from the camera 10 into the ECU 20.

The position estimation unit 22 estimates the position of the vehicle V1 (specifically, the position of the vehicle V1 at the time when a target captured image has been captured by the camera 10) in real time on the basis of the captured image of the camera 10, acquired by the image acquisition unit 21, and combined map information 251 stored in the storage unit 25. The position estimation unit 22 includes a VS unit 221, a neighboring point retrieval unit 222, a high-accuracy positional information searching unit 223, a relative position calculation unit 224, a correction parameter calculation unit 225, a relative position correction unit 226 and a host vehicle position calculation unit 227. The details of the units 221 to 227 will be described later.

The storage unit 25 stores the combined map information 251 in a target predetermined range (hereinafter, referred to as target range). The combined map information 251 includes VS map information 251A and high-accuracy positional information 251B. The VS map information 251A is generated with the use of a Visual SLAM algorithm (described later). The high-accuracy positional information 251B is provided in correspondence with the VS map information 251A.

The VS map information 251A is three-dimensional map information that is readable by the program of the Visual SLAM algorithm (described later), and is specifically three-dimensional map information represented by a plurality of pieces of image information corresponding to a plurality of captured images captured at a plurality of points over the target range. In the present embodiment, a plurality of pieces of (N pieces of) combined map information 251-1 to 251-N including a plurality of pieces of (in the present embodiment, N that is two or more pieces of) VS map information 251A-1 to 251A-N generated on the basis of captured images captured under different environmental conditions over the target range are stored in the storage unit 25.

The environmental conditions include any condition that the appearance of a captured image of the camera 10 is different even when the same object (terrestrial object, such as a building, a wall, a sign and a guard rail) is captured. For example, the environmental conditions include a time period condition (such as day or night), a season condition (such as summer or winter) and a weather condition (such as fine weather, cloudy weather, rainy weather, snowy weather or foggy weather). For example, the environmental conditions include a crowdedness condition of a roadway or sidewalk, and the like. This is because, when a roadway or sidewalk is crowded with vehicles, pedestrians, or the like, part of a terrestrial object, such as a building, is hard to be seen from the camera 10 due to vehicles or pedestrians.

Each of the pieces of high-accuracy positional information 251B includes positional information (first positional information) at a corresponding one of the points at which the plurality of captured images corresponding to the plurality of pieces of image information included in a corresponding one of the pieces of VS map information 251A were captured and that is acquired on the basis of information other than the plurality of pieces of image information. Each of the pieces of positional information included in the pieces of high-accuracy positional information 251B is relatively high-accuracy positional information, and is positional information based on, for example, GNSS/INS hybrid navigation, as will be described later. Each of the pieces of positional information included in the pieces of high-accuracy positional information 251B may be positional information that is generated on the basis of a range image of a high-accuracy time-of-flight (TOF) sensor, such as LIDAR.

Next, the process of generating the pieces of combined map information 251-1 to 251-N (the pieces of VS map information 251A-1 to 251A-N and the pieces of high-accuracy positional information 251B-1 to 251B-N) based on which the position of the vehicle V1 is estimated will be described with reference to FIG. 3 and FIG. 4.

Figure 3:
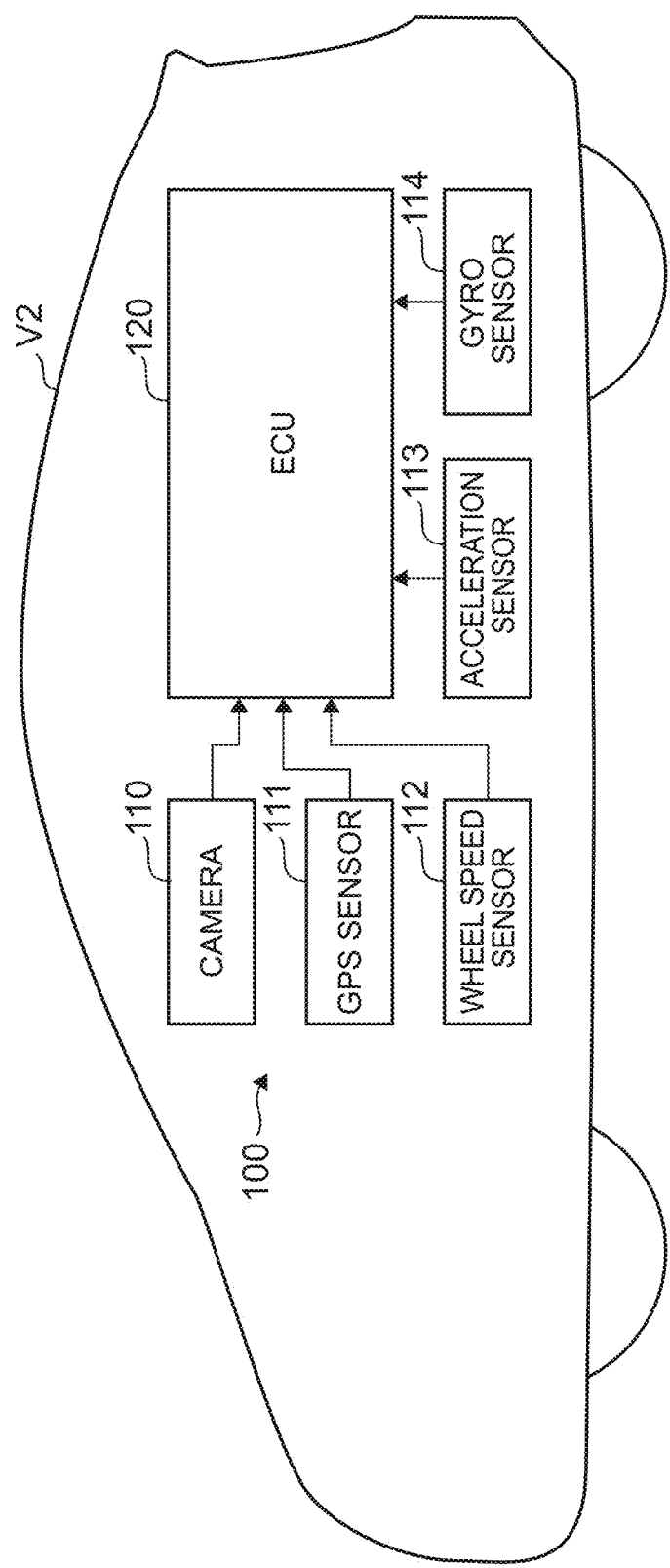
FIG. 3 is a block diagram that shows an example of the configuration of a map information generation system according to the embodiment.

FIG. 3 is a block diagram that schematically shows an example of the configuration of a map information generation system 100 according to the present embodiment. The map information generation system 100 according to the present embodiment is mounted on a vehicle V2. The map information generation system 100 includes a camera 110, a GPS sensor 111, a wheel speed sensor 112, an acceleration sensor 113, a gyro sensor 114 and an ECU 120.

The vehicle V1 and the vehicle V2 may be the same or may be different from each other. That is, the position estimation system 1 may estimate the position of the host vehicle by using the combined map information 251 that is generated by the map information generation system 100 mounted on another vehicle, or may estimate the position of the host vehicle by using the combined map information 251 generated by the map information generation system 100 mounted on the host vehicle.

The camera 110, as well as the camera 10, is an imaging device that captures an area around the vehicle V2, such as an area in front of the vehicle V2. The camera 110, for example, sequentially captures a predetermined range in front of the vehicle V2 in a period from completion of initial process after the IG-ON of the vehicle V2 to IG-OFF. The camera 110 is communicably connected to the ECU 120 via an in-vehicle network, such as a one-to-one communication line and a CAN, and outputs a captured image to the ECU 120. Hereinafter, as in the case of the camera 10, description will be made on the assumption that camera calibration of the camera 110 has been already completed and the internal parameters of the camera 110 and information about the relationship of the position and attitude of the camera 110 with respect to a reference coordinate system have been already acquired. That is, the ECU 120 is able to calculate a positional relationship, such as a distance between the camera 110 (vehicle V2) and a point on each object included in a captured image of the camera 110.

The GPS sensor 111 receives GPS signals that are distributed from GPS satellites that orbit around the earth, and measures the position of the vehicle V2 on the basis of the GPS signals (GPS measurement). The GPS sensor 111 is communicably connected to the ECU 120 via the in-vehicle network, such as a one-to-one communication line and a CAN, and outputs a measured result (GPS positional information) to the ECU 120.

The wheel speed sensor 112 is a known detector that detects the rotation speed of each wheel (wheel speed) of the vehicle V2. The wheel speed sensor 112 is communicably connected to the ECU 120 via the in-vehicle network, such as a one-to-one communication line and a CAN, and outputs a detected signal corresponding to each wheel speed (wheel speed information) to the ECU 120.

The acceleration sensor 113 is a known detector that detects the acceleration of the vehicle V2. The acceleration sensor 113 is communicably connected to the ECU 120 via the in-vehicle network, such as a one-to-one communication line and a CAN, and outputs a detected signal corresponding to the acceleration (acceleration information) to the ECU 120.

The gyro sensor 114 detects the angular velocities of the vehicle V2 (for example, angular velocities around three axes, that is, the longitudinal axis, lateral axis and normal axis of the vehicle V2). The gyro sensor 114 is communicably connected to the ECU 120 via the in-vehicle network, such as a one-to-one communication line and a CAN, and outputs a detected signal corresponding to the angular velocities (angular velocity information) to the ECU 120.

The ECU 120 is an electronic control unit that generates the combined map information 251 on the basis of pieces of information, which are input from the camera 110, the GPS sensor 111, the wheel speed sensor 112, the acceleration sensor 113 and the gyro sensor 114. The ECU 120, as well as the ECU 20, is, for example, mainly formed of a microcomputer including a CPU, a RAM, a ROM, an I/O, and the like, and implements various control processes by executing various programs stored in the ROM on the CPU. Hereinafter, the specific functional configuration of the ECU 120 will be described with reference to FIG. 4.

FIG. 4 is a functional block diagram that schematically shows an example of the configuration of the ECU 120.

The ECU 120 includes an image acquisition unit 121, a GPS positional information acquisition unit 122, a wheel speed information acquisition unit 123, an acceleration information acquisition unit 124, an angular velocity information acquisition unit 125, a VS unit 126, a scale correction unit 127 and a positional information generation unit 128 as functional units that are implemented by executing one or more programs stored in the ROM.

The image acquisition unit 121 acquires, from an input buffer in the RAM, a captured image that is sequentially input from the camera 110 into the ECU 120.

The GPS positional information acquisition unit 122 acquires, from the input buffer in the RAM, GPS positional information that is sequentially input from the GPS sensor 111 into the ECU 120.

The wheel speed information acquisition unit 123 acquires, from the input buffer in the RAM, wheel speed information that is sequentially input from the wheel speed sensor 112 into the ECU 120.

The acceleration information acquisition unit 124 acquires, from the input buffer in the RAM, acceleration information that is sequentially input from the acceleration sensor 113 into the ECU 120.

The angular velocity information acquisition unit 125 acquires, from the input buffer in the RAM, angular velocity information that is sequentially input from the gyro sensor 114 into the ECU 120.

The VS unit 126 estimates the position of the vehicle V2 (camera 110) with the use of a known Visual SLAM algorithm on the basis of a captured image that is sequentially acquired by the image acquisition unit 121, extracts feature points, or the like, of an object (such as a terrestrial object) included in the captured image, and generates three-dimensional map information (VS map information 251A) including the three-dimensional positions of the extracted feature points, or the like. The Visual SLAM is able to estimate a travel and the direction of travel from the last position of the vehicle V2 (camera 110) or estimate the attitude of the vehicle V2 (that is, the orientation of the camera 110) by extracting feature points from a sequentially input captured image and executing tracking process on the feature points. Thus, the Visual SLAM is able to estimate in real time the position of the vehicle V2 from a sequentially input captured image when an initial position in a global coordinate system, such as a map coordinate system represented by latitude, longitude and altitude, is given. While the vehicle V2 is moving in a target range, the VS unit 126 estimates the position of the camera 110 (vehicle V2) at a point at which a captured image was captured and calculates the positions of feature points of the captured image on the basis of the captured image that is sequentially acquired by the image acquisition unit 121. Thus, the VS unit 126 is able to generate three-dimensional map data that includes pieces of positional information of a plurality of feature points extracted from each of captured images at a plurality of points over the target range and pieces of positional information of the points at which the captured images were captured (an example of second positional information, that is, the pieces of positional information of the vehicle V2 (camera 110) at the time when the captured images were captured.

The Visual SLAM algorithm according to the present embodiment just needs to be able to estimate a position and generate three-dimensional map information on the basis of a sequentially input image. For example, ORiented-Brief (ORB)-SLAM, Large-Scale Direct monocular (LSD)-SLAM, Parallel Tracking And Mapping (PTAM), or the like, may be selectively applied.

The scale correction unit 127 corrects the scale of three-dimensional map data that is generated by the VS unit 126 on the basis of wheel speed information (the vehicle speed of the vehicle V2) that is acquired by the wheel speed information acquisition unit 123. This is because the three-dimensional map data that is generated by the VS unit 126 can have a scale error. The scale correction unit 127 corrects the scale of the three-dimensional map data that is generated by the VS unit 126, and stores the corrected three-dimensional map data in the storage unit 129 as the VS map information 251A.

Figure 5A:
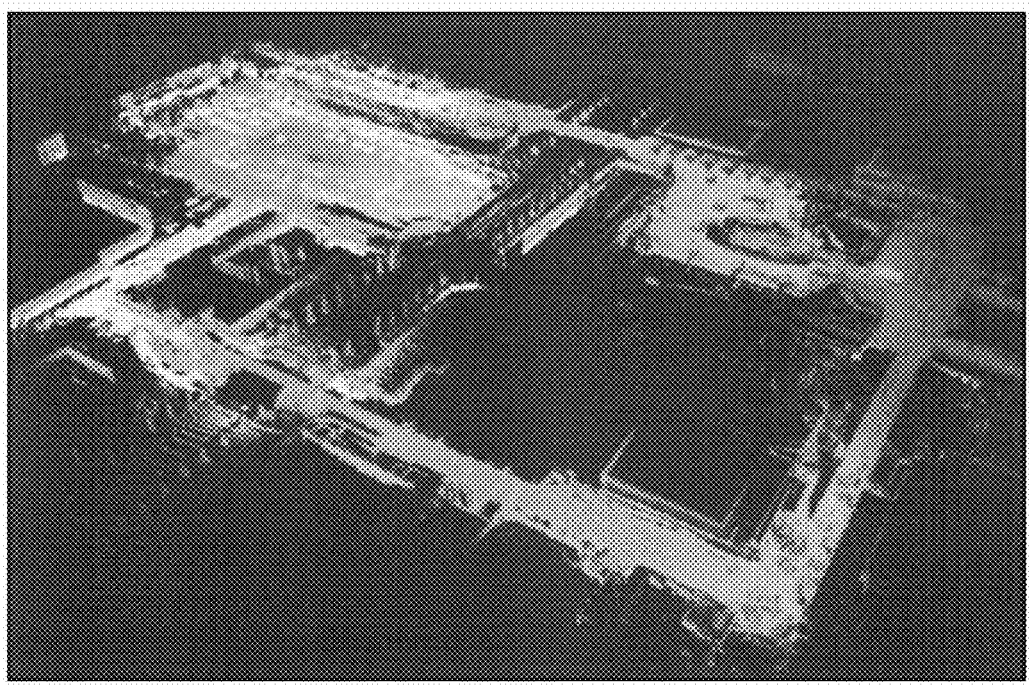
FIG. 5A is a view that shows an example of three-dimensional map information based on Visual SLAM (VS map information)
Figure 5B:
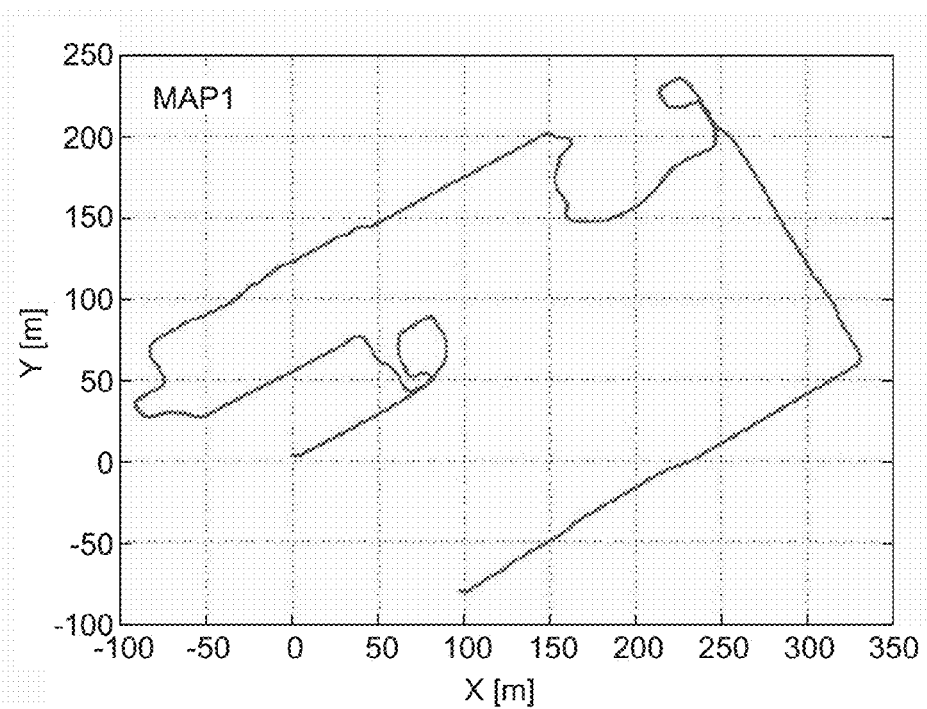
FIG. 5B is a view that shows an example of three-dimensional map information based on Visual SLAM (VS map information)

FIG. 5A and FIG. 5B are views that show an example of three-dimensional map data (VS map information 251A) that is generated by Visual SLAM. Specifically, FIG. 5A is an example of the three-dimensional map data of a target range, which is represented by the pieces of positional information of feature points extracted from captured images at a plurality of points over the target range. FIG. 5B is an example of map data that shows the positional information of the vehicle V2 at the time when captured images at the plurality of points over the target range were captured as a travel path.

For the sake of easy illustration, FIG. 5B shows two-dimensional map data that height (altitude) information within the three-dimensional positional information (travel path) of the vehicle V2 is omitted.

As shown in FIG. 5A and FIG. 5B, the VS map information 251A includes three-dimensional map data that represents the pieces of positional information of a plurality of feature points extracted from captured images at a plurality of points over a target range and three-dimensional map data that represents a travel path connecting points corresponding to the pieces of positional information of the points at which the captured images were captured, that is, the points corresponding to the pieces of positional information of the vehicle V2 (camera 110) at the time when the captured images were captured, with a lapse of time. Hereinafter, each position of the vehicle V2 (camera 110) in a travel path at the time when a corresponding one of the captured images was captured may be referred to as key frame.

Referring back to FIG. 4, the positional information generation unit 128 generates relatively high-accuracy positional information corresponding to each point at which a corresponding one of captured images that are sequentially captured by the image acquisition unit 121 was captured. For example, the positional information generation unit 128 generates the positional information of the vehicle V2 (camera 110) with the use of known GNSS/INS hybrid navigation on the basis of GPS positional information acquired by the GPS positional information acquisition unit 122, wheel speed information acquired by the wheel speed information acquisition unit 123, acceleration information acquired by the acceleration information acquisition unit 124, and angular velocity information acquired by the angular velocity information acquisition unit 125. The positional information generation unit 128 stores positional information, which is generated in correspondence with each of captured images that are sequentially acquired by the image acquisition unit 121, in the storage unit 129 as the high-accuracy positional information 251B.

The positional information generation unit 128 may generate relatively high-accuracy positional information on the basis of a range image of a high-accuracy TOF sensor, such as LIDAR. In this case, the positional information generation unit 128 generates the positional information of the vehicle V2 by executing tracking process on a range image that is sequentially acquired by the TOF sensor on the basis of relatively high-accuracy initial position information (for example, GPS positional information under a situation in which GPS signals from a large number of GPS satellites are favorably receivable).

In this way, the map information generation system 100 is able to generate the pieces of combined map information 251-1 to 251-N based on a plurality of images captured under mutually different environmental conditions as a result of at least N-time travel of the vehicle V2 in the target range under mutually different environmental conditions.

Next, a position estimation process that is executed by the position estimation system 1 (position estimation unit 22) will be described with reference to FIG. 6, FIG. 7A and FIG. 7B.

Figure 6:
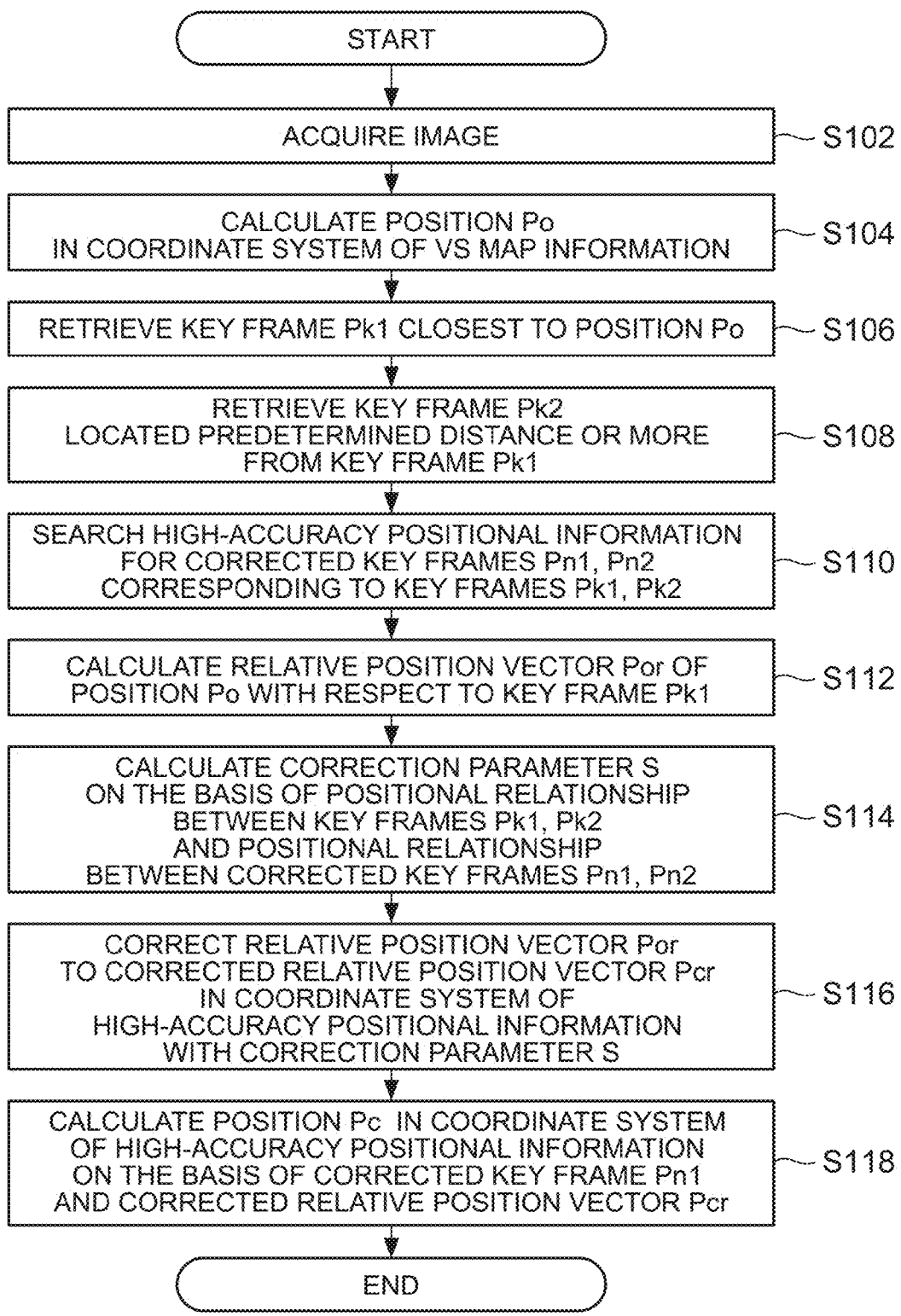
FIG. 6 is a flowchart that schematically shows an example of a position estimation process that is executed by the position estimation system according to the embodiment.
Figures 7A, 7B:
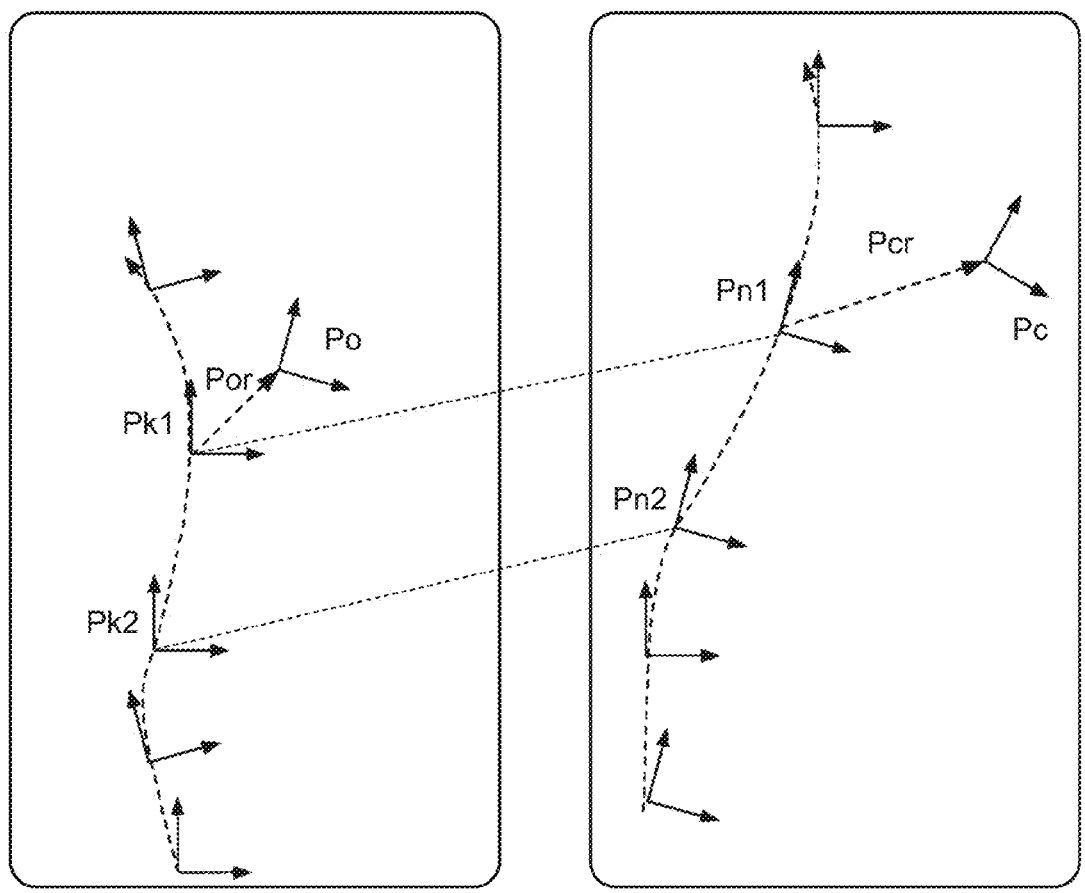
FIG. 7A is a conceptual view that illustrates an example of the position estimation process that is executed by the position estimation system according to the embodiment.
FIG. 7B is a conceptual view that illustrates an example of the position estimation process that is executed by the position estimation system according to the embodiment.

FIG. 6 is a flowchart that schematically shows an example of the position estimation process that is executed by the position estimation system 1 according to the present embodiment. FIG. 7A and FIG. 7B are conceptual views that illustrate an example of the position estimation process that is executed by the position estimation system 1 according to the present embodiment. Specifically, FIG. 7A and FIG. 7B are views that illustrate a method of correcting a position Po of the vehicle V1 in the coordinate system of the VS map information 251A to a position Pc of the vehicle V1 in the coordinate system of the high-accuracy positional information 251B.

The flowchart shown in FIG. 6 may be executed each time a captured image is input from the camera 10 into the ECU 20 in a period from completion of initial process of the ECU 20 after the IG-ON of the vehicle V1 to IG-OFF. The flowchart shown in FIG. 6 is executed over each of the N pieces of combined map information 251-1 to 251-N (the pieces of VS map information 251A-1 to 251A-N). The flowchart shown in FIG. 6 is predicated on the fact that the VS unit 126 has already read the VS map information 251A (specifically, any intended one of the pieces of VS map information 251A-1 to 251A-N).

Referring to FIG. 6, in step S102, the image acquisition unit 21 acquires, from the input buffer, or the like, in the RAM, a captured image of the camera 10, which is input into the ECU 20.

In step S104, the VS unit 221 calculates the position Po of the vehicle V1 (see FIG. 7A) in the coordinate system of the VS map information 251A (three-dimensional map data) with the use of the Visual SLAM algorithm.

The VS unit 221 can be not able to calculate the position Po of the vehicle V1 on the basis of the feature points of the captured image of the camera 10 and the three-dimensional map data that represents the pieces of positional information of the feature points of the VS map information 251A (any one of the pieces of VS map information 251A-1 to 251A-N) depending on an environmental condition around the vehicle V1. In this case, the flowchart of FIG. 6 for the intended combined map information 251 (any one of the pieces of combined map information 251-1 to 251-N) ends by interrupt.

In step S106, the neighboring point retrieval unit 222 retrieves a key frame Pk1 (see FIG. 7A) closest to the position Po in the travel path of the vehicle V2. The travel path is included in the VS map information 251A.

In step S108, the neighboring point retrieval unit 222 retrieves a key frame Pk2 located a predetermined distance or more from the key frame Pk1 found in step S106, for example, a closest key frame Pk2 (see FIG. 7A) among key frames located the predetermined distance or more from the key frame Pk1 in the travel path.

In step S110, the high-accuracy positional information searching unit 223 searches the content of the high-accuracy positional information 251B, and acquires positions (corrected key frames) Pn1, Pn2 (see FIG. 7B) respectively corresponding to the key frames Pk1, Pk2.

In step S112, the relative position calculation unit 224 calculates a relative position vector Por (see FIG. 7A) of the position Po with respect to the key frame Pk1 on the three-dimensional map data of the VS map information 251A.

In step S114, the correction parameter calculation unit 225 calculates a correction parameter S for correcting from the coordinate system of the VS map information 251A to the coordinate system of the high-accuracy positional information 251B. Specifically, the correction parameter calculation unit 225 calculates a correction parameter S (a parameter for correcting a scale and a direction angle) on the basis of a positional relationship between the key frames Pk1, Pk2 and a positional relationship between the corrected key frames Pn1, Pn2.

In step S116, the relative position correction unit 226 corrects the relative position vector Por in the coordinate system of the VS map information 251A to the relative position vector Pcr in the coordinate system of the high-accuracy positional information 251B, that is, the relative position vector Pcr (see FIG. 7B) of the position Pc of the vehicle V1 with respect to the corrected key frame Pn1 in the coordinate system of the high-accuracy positional information 251B. Specifically, the relative position correction unit 226 corrects the relative position vector Por in the coordinate system of the VS map information 251A to the relative position vector Pcr in the coordinate system of the high-accuracy positional information 251B by using the correction parameter S.

In step S118, the host vehicle position calculation unit 227 calculates the position Pc of the vehicle V1 (in the coordinate system of the high-accuracy positional information 251B) on the basis of the corrected key frame Pn1 and the relative position vector Pcr.

The host vehicle position calculation unit 227 may, for example, set the average of all as the position of the vehicle V1 when the position Pc of the vehicle V1 has been calculated in multiple processes among the processes of FIG. 6 respectively corresponding to the pieces of combined map information 251-1 to 251-N. The host vehicle position calculation unit 227 may, for example, exclude abnormal calculated results (for example, the calculated position Pc of the vehicle V1 falls outside a predetermined range with respect to the average of all) and set the average of the remainder as the position of the vehicle V1. The host vehicle position calculation unit 227 may set one of a plurality of calculated results as the position of the vehicle V1 in response to coincidence of a current environmental condition around the vehicle V1 with environmental conditions respectively corresponding to the pieces of VS map information 251A-1 to 251A-N. The position estimation unit 22 may select one or a plurality of pieces of combined map information 251-$k$ ($k$=1, 2, ..., N) that conform to the current environmental condition around the vehicle V1 from among the pieces of combined map information 251-1 to 251-N and execute the process of FIG. 6 for the selected combined map information 251-$k$. In this case, the position estimation unit 22 may, for example, determine an environmental condition (a condition associated with a time period, weather, the crowdedness of a roadway and sidewalk, or the like) around the vehicle V1 by analyzing a captured image that is acquired by the image acquisition unit 21 with the use of a known method. The position estimation unit 22 may determine a condition associated with a time period on the basis of an internal clock (not shown) of the ECU 20. The position estimation unit 22 may determine a condition associated with weather on the basis of weather information that is distributed from a weather information server, or the like, arranged remote from the vehicle V1, a detected signal of a rain sensor (not shown), or the like, mounted on the vehicle V1, or the like. The position estimation unit 22 may determine a condition associated with the crowdedness (congestion) of a roadway on the basis of traffic information, or the like, that is distributed from a road information server, or the like, arranged remote from the vehicle V1.

In this way, the position estimation system 1 according to the present embodiment includes the storage unit 25, the image acquisition unit 21 and the position estimation unit 22. The storage unit 25 stores pieces of combined map information 251-1 to 251-N. The pieces of combined map information 251-1 to 251-N respectively include a plurality of pieces of image information (a corresponding one of the pieces of VS map information 251A-1 to 251A-N) corresponding to one of a plurality of images captured at a plurality of points over a predetermined range and the pieces of combined map information 251-1 to 251-N respectively include a plurality of pieces of first positional information (a corresponding one of the pieces of high-accuracy positional information 251B-1 to 251B-N) corresponding to one of the plurality of points and acquired on the basis of information other than the plurality of pieces of image information. The environmental conditions of the pieces of combined map information 251-1 to 251-N at the time when the plurality of images were captured are different from each other. The image acquisition unit 21 acquires an image captured by the camera 10 mounted on the mobile unit (vehicle V1). The position estimation unit 22 estimates the position of the mobile unit on the basis of the image acquired by the image acquisition unit 21 and the plurality of pieces of combined map information 251-1 to 251-N. Therefore, in the present embodiment, the high-accuracy positional information 251B acquired on the basis of information other than the plurality of pieces of image information, such as high-accuracy positional information that is acquired on the basis of GNSS/INS hybrid navigation, a range image of LIDAR, or the like, is associated with the plurality of pieces of image information included in each of the pieces of combined map information 251-1 to 251-N (each of the pieces of VS map information 251A-1 to 251A-N). That is, in estimating the position of the mobile unit on the basis of an image that is acquired by the camera 10 of the mobile unit and a plurality of pieces of image information corresponding to a plurality of images captured at a plurality of points over a predetermined range, positional information having higher accuracy than positional information that can be acquired from the plurality of pieces of image information is utilized as each of the pieces of high-accuracy positional information 251B-1 to 251B-N that are generated on the basis of information other than the pieces of image information. For this reason, the position estimation system 1 is able to estimate the position of the mobile unit with relatively high accuracy on the basis of the image that is acquired by the camera 10 of the mobile unit and the pieces of combined map information 251-1 to 251-N. The position estimation system 1 has pieces of combined map information 251-1 to 251-N of which environmental conditions at the time when a plurality of images corresponding to a plurality of pieces of image information were captured are different from each other. Therefore, for example, even when the environmental condition, that is, a time period condition (such as morning, daytime and night) or a weather condition (such as fine weather, cloudy weather, rainy weather, snowy weather and foggy weather), changes like the appearance of an image that is captured by the camera 10 of the mobile unit significantly varies, the pieces of combined map information 251-1 to 251-N are highly likely to include the combined map information 251-*k* (k=1, 2, ..., N) that conforms to the current environmental condition around the mobile unit. That is, it is highly likely to be able to estimate the position of the mobile unit with the use of a plurality of pieces of image information of any one of the pieces of combined map information 251-1 to 251-N (any one of the pieces of VS map information 251A-1 to 251A-N) against such a change of the environmental condition that the appearance of an image that is captured by the camera 10 of the mobile unit significantly varies. For this reason, it is possible to suppress a decrease in position estimation accuracy due to a change of an environmental condition around the mobile unit.

The position estimation system 1 (position estimation unit 22) according to the present embodiment calculates the position of the mobile unit on the basis of an image acquired by the image acquisition unit 21 and a plurality of pieces of image information (VS map information 251A-1 to 251A-N) respectively included in the pieces of combined map information 251-1 to 251-N, and estimates the position of the mobile unit by correcting the calculated position of the mobile unit on the basis of a corresponding one of the pieces of high-accuracy positional information 251B-1 to 251B-N respectively included in the pieces of combined map information 251-1 to 251-N. Therefore, the position estimation system 1 calculates the position of the mobile unit on the basis of, for example, a comparison between the image that is acquired by the camera 10 of the mobile unit and each of the plurality of pieces of image information (pieces of VS map information 251A-1 to 251A-N), and corrects the calculated position of the mobile unit on the basis of a corresponding one of the pieces of high-accuracy positional information 251B-1 to 251B-N, associated with the plurality of pieces of image information. Thus, specifically, it is possible to estimate the position of the mobile unit with relatively high accuracy.

The plurality of pieces of image information (each of the pieces of VS map information 251A-1 to 251A-N) according to the present embodiment are three-dimensional map data that includes pieces of positional information of a plurality of feature points extracted from a plurality of images and a plurality of pieces of second positional information that correspond to positions at which the plurality of images were respectively captured and that are acquired on the basis of the pieces of positional information of the plurality of feature points corresponding to each of the plurality of images. The position estimation system 1 (position estimation unit 22) extracts a plurality of feature points from an image acquired by the image acquisition unit 21, calculates the position of the mobile unit on the basis of the pieces of positional information of the plurality of extracted feature points and the pieces of positional information of the plurality of feature points included in the three-dimensional map data, and corrects the calculated position of the mobile unit on the basis of a correspondence relationship between the second positional information and the first positional information. Thus, the position estimation system 1 estimates the position of the mobile unit. Specifically, the position estimation system 1 is, for example, able to calculate the position of the mobile unit on the basis of three-dimensional map data (pieces of VS map information 251A-1 to 251A-N) generated with the use of Visual SLAM, or the like. The position estimation system 1 (position estimation unit 22) corrects the position of the mobile unit on the basis of the correspondence relationship between the key frames included in each of the pieces of VS map information 251A-1 to 251A-N and a corresponding one of the pieces of high-accuracy positional information 251B-1 to 251B-N. Thus, the position estimation system 1 is able to estimate the position of the mobile unit with relatively high accuracy.

Ordinarily, VS map information 251A-1 to 251A-N that are generated at different timings mostly have different scales of the corresponding coordinate system. For this reason, in order to suppress a decrease in position estimation accuracy due to a change of an environmental condition around the mobile unit, it may not be able to estimate the position of the mobile unit with the same scale even with the use of the plurality of pieces of VS map information 251A-1 to 251A-N corresponding to different environmental conditions because the scales of the coordinate systems of the pieces of VS map information 251A-1 to 251A-N are different from each other. In contrast, in the present embodiment, pieces of high-accuracy positional information 251B-1 to 251B-N having coordinate systems of which the scales are substantially equal to each other are respectively associated with the pieces of VS map information 251A-1 to 251A-N. For this reason, even when the scales of the coordinate systems of the pieces of VS map information 251A-1 to 251A-N are different from each other, it is possible to estimate the position of the mobile unit with the same scale with the use of the coordinate systems of the pieces of high-accuracy positional information 251B-1 to 251B-N.

In the present embodiment, the position of the mobile unit is estimated on the basis of VS map information 251A-1 to 251A-N as a plurality of pieces of image information corresponding to a plurality of points with the use of Visual SLAM. As long as the position of the mobile unit is estimated on the basis of a plurality of pieces of image information corresponding to a plurality of points, a method other than Visual SLAM (such as, a position estimation method that uses Place recognition) may be used.

In the present embodiment, the position estimation system 1 is mounted on the mobile unit (vehicle V1) that is an object of which the position is estimated. Instead, the position estimation system 1 may be provided outside the mobile unit (for example, a center). In this case, for example, the position estimation system 1 is arranged remote from the mobile unit that is an object of which the position is estimated in such a manner that the position estimation system 1 is able to receive an image captured by the camera 10 from the mobile unit, receives a captured image of the camera 10, which is sequentially transmitted from the mobile unit, and estimates the position of the mobile unit on the basis of the received captured image of the camera 10. Thus, it is possible to estimate the position of the mobile unit at a location remote from the mobile unit (such as a center).

The embodiments of the disclosure are described above; however, the disclosure is not limited to the above-described specific embodiments. The embodiments of the disclosure may be variously modified or changed within the scope of the disclosure recited in the appended claims.

What is claimed is:

1. A position estimation system that estimates a position of a mobile unit including a camera that captures an image of an area around the mobile unit, the position estimation system comprising:
an electronic control unit configured to
store a plurality of pieces of map information, the plurality of pieces of map information respectively including a plurality of pieces of image information and the plurality of pieces of map information respectively including a plurality of pieces of first positional information, the plurality of pieces of image information corresponding to a plurality of images respectively captured at a plurality of points within a predetermined range, the plurality of pieces of first positional information being acquired based on information other than the plurality of pieces of image information and respectively corresponding to the plurality of points, environmental conditions of the plurality of pieces of map information at a time when the plurality of images were captured are different from each other, acquire an image captured by the camera, and estimate the position of the mobile unit based on the image acquired by the electronic control unit and the plurality of pieces of map information.

2. The position estimation system according to claim 1, wherein the electronic control unit is configured to estimate the position of the mobile unit by calculating the position of the mobile unit based on the image acquired by the electronic control unit and the plurality of pieces of image information respectively included in the plurality of pieces of map information and correcting the calculated positon of the mobile unit based on the plurality of pieces of first positional information respectively included in the plurality of pieces of map information.

3. The position estimation system according to claim 2, wherein the plurality of pieces of image information are three-dimensional map data, the three-dimensional map data includes pieces of positional information of a plurality of feature points extracted from each of the plurality of images and a plurality of pieces of second positional information corresponding to positions at which the plurality of images were respectively captured, the plurality of pieces of second positional information are acquired based on the pieces of positional information of the plurality of feature points corresponding to each of the plurality of images, and the electronic control unit is configured to estimate the position of the mobile unit by extracting the plurality of feature points from the acquired image, calculating the position of the mobile unit based on the pieces of positional information of the plurality of extracted feature points and the pieces of positional information of the plurality of feature points included in the three-dimensional map data, and correcting the calculated position of the mobile unit based on a correspondence relationship between the second positional information and the first positional information.

4. The position estimation system according to claim 1, wherein the position estimation system is arranged remote from the mobile unit such that the position estimation system is able to receive the image captured by the camera and transmitted from the mobile unit.

5. The position estimation system according to claim 1, wherein each of the environmental conditions is at least one of a time period condition, a season condition, a weather condition and a crowdedness condition of a roadway and sidewalk.

6. A mobile unit comprising the position estimation system according to claim 1.

7. A position estimation method in which an electronic control unit stores a plurality of pieces of map information, the plurality of pieces of map information respectively include a plurality of pieces of image information and the plurality of pieces of map information respectively include a plurality of pieces of first positional information, the plurality of pieces of image information correspond to a plurality of images respectively captured at a plurality of points over a predetermined range, the plurality of pieces of first positional information, acquired based on information other than the plurality of pieces of image information, correspond to the plurality of points, environmental conditions of the plurality of pieces of map information at a time when the plurality of images were captured are different from each other, and the electronic control unit estimates a position of a mobile unit including a camera that captures an image of an area around the mobile unit, the position estimation method comprising:

acquiring, by the electronic control unit, the image captured by the camera; and estimating, by the electronic control unit, the position of the mobile unit based on the acquired image and the plurality of pieces of map information.

8. The position estimation method according to claim 7, wherein in estimating the position of the mobile unit, the position of the mobile unit is calculated by the electronic control unit from positional information in the map information, a first key frame closest to the calculated position of the mobile unit is retrieved, a second key frame located a predetermined distance or more from the first key fame is retrieved, a first corrected key frame corresponding to the first key frame and a second corrected key frame corresponding to the second key frame are acquired from a high-accuracy positional information of the map information, a relative position vector with respect to the first key frame is calculated, a correction parameter for correcting a scale and a direction angle is calculated based on the first key frame, the second key frame, the first corrected key frame and the second corrected key frame, the relative position vector is corrected to a corrected relative position vector in a coordinate system of the high-accuracy positional information with the use of the correction parameter, and a position in the coordinate system of the high-accuracy positional information is calculated based on the first corrected key frame and the corrected relative position vector.

* * * * *